April 15, 1958 C. J. COBERLY 2,830,677
PROCESS OF CONCENTRATING ACETYLENE FROM A GASEOUS
MIXTURE BY USE OF A SINGLE SOLVENT
Filed Jan. 17, 1955 5 Sheets-Sheet 1

*Fig. 1.*

CLARENCE J. COBERLY,
INVENTOR.

By His Attorneys.

HARRIS, KIECH, FOSTER & HARRIS

Fig. 2.
CRACKING

CLARENCE J. COBERLY,
INVENTOR.

By His Attorneys
HARRIS, KIECH, FOSTER & HARRIS.

United States Patent Office 2,830,677
Patented Apr. 15, 1958

2,830,677

PROCESS OF CONCENTRATING ACETYLENE FROM A GASEOUS MIXTURE BY USE OF A SINGLE SOLVENT

Clarence J. Coberly, San Marino, Calif., assignor to Wulff Process Company, Huntington Park, Calif., a corporation of California Application January 17, 1955, Serial No. 482,366

2 Claims. (Cl. 183—115)

My invention relates to the production of acetylene ($C_2H_2$) gas by thermal cracking in which a suitable hydrocarbon feed gas is subjected to pyrolysis and converted into a multicomponent cracked gas containing a substantial portion of acetylene.

Various hydrocarbons are known to be suitable for such purpose such as methane, ethane, propane, butane and their derivatives and mixtures of such hydrocarbons such as natural gas, off-gas extracted from natural gas and gas or gas mixtures produced by various processes such as oil refining, coke manufacture and the like. The process is hereinafter described as applied to the production and segregation of acetylene from propane, this particular example being selected to enable the process to be readily described, there being no intention of restricting the invention to this example or this particular use of the process.

This invention is concerned primarily with the acetylene concentration system, but it is designed so that it is interrelated with the thermal cracking unit and it provides means for improving the efficiency of the thermal cracking unit. It is well suited to separate acetylene from cracked gases containing as low as five percent (5%) by volume of acetylene. The economical and fairly complete separation of acetylene from such gas mixture has heretofore been difficult.

In the production of acetylene by thermal cracking of petroleum gases, for example, it has been found that the acetylene concentration is low, as a result of which the separation from the other gases present is a major problem and has heretofore resulted in a very large part of the capital investment in the process being required for this purpose.

A primary object of this invention, therefore, is to simplify the method of separation, for the purpose of both reducing the capital investment in this separation equipment and for reducing the operating costs and the hazards of operation.

The combination of the method of separation of my invention with heat and make cracking as hereinafter described makes it possible to produce low cost acetylene in small plants, whereas previously, thermal cracking could only be economically justified in very large installations such as those required for chemical use of the acetylene. The method disclosed is applicable to plants for producing cylinder gas acetylene which might produce only 1000 pounds per day or less. Tonnage plants for chemical use might be for 100 tons per day or more. The method is also equally well suited to large plants, so its range of practical application is very wide.

Thermal cracking of methane, ethane, propane or heavier gas produces, in addition to acetylene and hydrogen, other gases which not only reduce the yield of acetylene but also give trouble in the usual methods of concentration of acetylene and maybe undesirable impurities in the final product. A typical analysis of the cracked gas, which is used for illustrative purposes in this application, is as follows:

| | Percent by volume |
|---|---|
| $CO$ | 8.2 |
| $N_2$ | 6.0 |
| $H_2$ | 50.8 |
| $CH_4$ | 15.2 |
| $C_2H_2$ | 9.6 |
| $C_2H_4$ | 7.1 |
| $C_2H_6$ | .1 |
| $C_3H_4$ | .4 |
| $C_3H_6$ | .1 |
| $C_3H_8$ | .2 |
| $C_4H_2$ | .1 |
| $C_4H_4$ | .3 |
| $C_4H_6$ | .1 |
| $C_6H_6$ | .3 |
| $CO_2$ | 1.5 |

The higher acetylenes $C_3H_4$, $C_4H_2$, $C_4H_4$, $C_4H_6$, and $C_6H_6$ total to 1.2% of the cracked gas formed and should be separated from the acetylene in the final product. Also, some of these heavy acetylenes should be eliminated because they are unstable and tend to polymerize and accumulate in the piping and equipment in the form of gums or gels which are highly explosive. This is particularly true of di-acetylene, $C_4H_2$, which is considered dangerous to handle except in a very dilute state. As formed by the process disclosed, the di-acetylene is seldom over .10% by volume and therefore is dilute but should it polymerize and accumulate, its concentration may reach a point where it spontaneously decomposes with a violent explosion.

It is therefore an object of this invention to separate these heavy acetylenes without permitting a high concentration of the unstable ones at any point in the system.

It is also an object of this invention to accomplish the elimination of di-acetylene without subjecting same to high temperatures, as the tendency to polymerize increases with temperature.

A further objective of the invention is to eliminate di-acetylene as a first operation in the process to avoid the possibility of it or its polymers accumulating in subsequent operations. This is particularly an advantage since it is desirable to use heat in the other steps of the process of concentrating the acetylene.

It is a further object of the process to return the heavy acetylenes to the cracking unit to conserve the carbon fed to the process and therefore to obtain a higher yield. It has been found that this can be done without causing any increase of these heavy acetylenes in the cracked gas and therefore the feeding of these gases back to the furnace is equivalent to feeding a corresponding amount of carbon in propane or methane and therefore the requirement of propane or methane for a given acetylene production is reduced.

As will be seen from a study of the cracked gas above defined, the cracked gas contains fifteen different gases only one of which is a desired end product. The separation of these is obtained by solvent extraction and it might appear to a competent chemical engineer that two or more solvents would be needed to effect such separation.

It is, however, also an important object of this process in connection with the object of reducing capital investment and operating cost and simplifying the operation, to use but a single solvent for the entire process. This materially reduces the amount of equipment required, since only one solvent pump, solvent tank and solvent piping system and associated controls and instrumentation are required. This is also important in that a smaller number of absorption, rectifying and stripping columns is required to obtain a high purity product. Also, this is very important in operation as it entirely eliminates the possibility of contamination of one solvent by another, due to malfunction of any one of several items of equipment. For instance, it is now common to use three solvents to accomplish the same result, and should the first absorption column foam over into the second, or even a small amount of liquid be continually carried over in suspension, the second liquid becomes contaminated and may fail to function. The same is true with respect to the second and third liquids.

The solvents used are in some cases quite expensive (40¢ to 50¢ per pound) and the amount required to charge the system is quite high. In fact, the initial cost of solvents may be 2% to 3% of the entire cost of the plant, and the loss of these solvents by contamination could constitute a very large item of operating expense.

A further object of this invention is to return all gases containing acetylenes in any form to the cracking unit rather than discharging to the off-gas fuel line or atmosphere. It is also an object to return a high percentage of all $C_2$ and heavier gases to the furnace to accomplish a high yield. This invention therefore encompasses a substantially closed system with only an inlet for feed stock and outlets for product and/or by-products and for off-gas to be used for fuel in the process, or for sale as such.

It is a further object of the invention to provide a means of concentrating acetylene to a high degree of purity without requiring the use of solvents having extremely high absorption selectivity. This permits the use of lower cost solvents and also permits the separation of more constituents of the cracked gas, either as by-products or for recycling to the furnace.

It is a further object to provide means for recycling gas from the first rectifying column to the compressor to increase the concentration of the desired constituents in the absorption column so as to effect a more complete separation of the gases produced.

Further objects and advantages of this invention will become apparent from the following detailed description when considered with the accompanying drawings, which are for the purpose of illustration only and in which:

Figure 1:
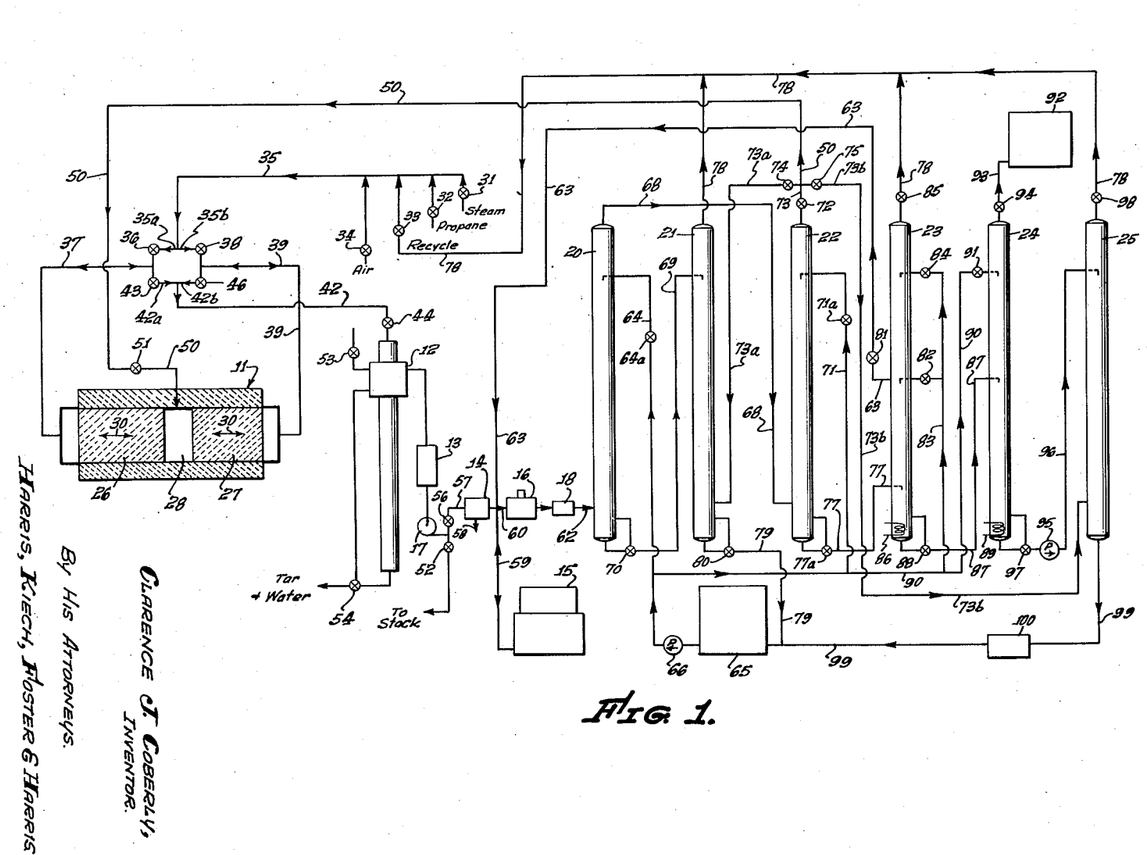
Fig. 1 is a composite flow diagram of the single solvent separation process of my invention.

Referring to Fig. 1, it may be seen that the apparatus employed to apply this process may be divided into two classes: first the cracking equipment which includes principally a double regenerative cracking furnace 11, a tar extractor 12, a cooler condenser 13, an electrostatic precipitator 14, a gas holder 15 for cracked gas, a compressor 16, a blower 17 and a cooler 18; and secondly the separation equipment which consists essentially of a diacetylene absorber 20, a di-acetylene stripper 21, an acetylene absorber 22, a di-acetylene rectifying column 23, a second acetylene rectifying column 24 and a final solvent stripper 25. In addition to these principal items of equipment shown in Fig. 1, various lines, valves, control instruments, pumps, tanks, and the like as described hereinafter, are included in the system.

Figure 2:
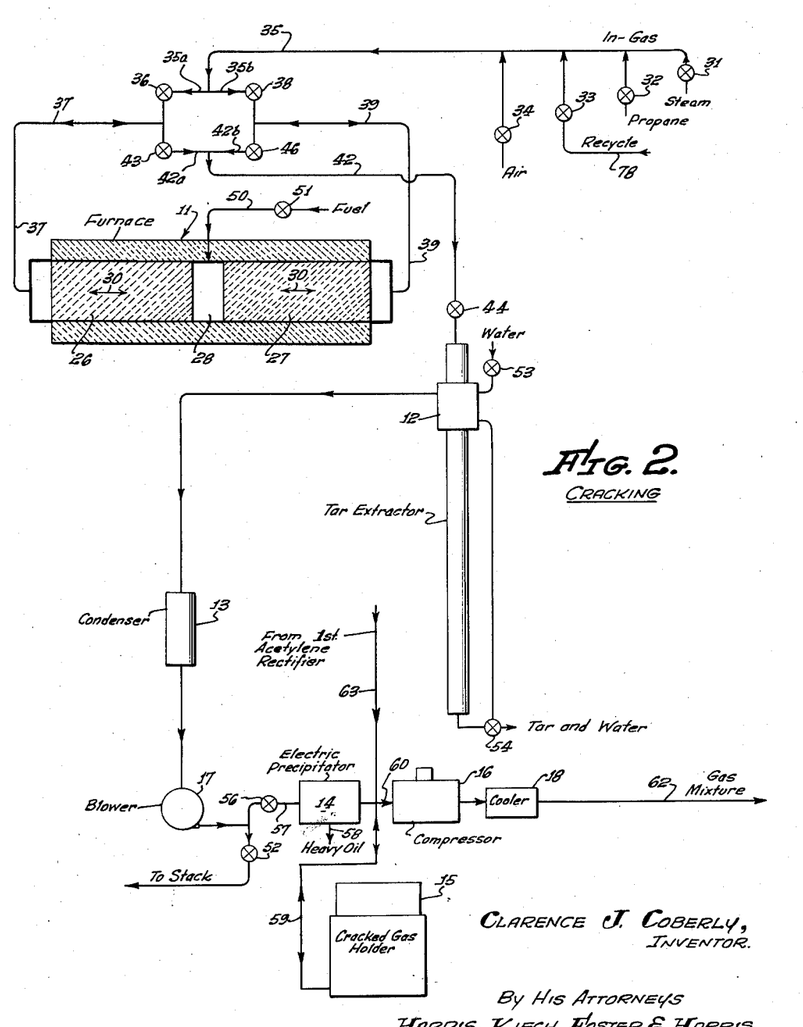
Fig. 2 is a section of the flow diagram shown in Fig. 1 illustrating in greater detail the cracking process.

Referring to Fig. 2, the furnace 11, shown in section, comprises a first regenerative mass 26 and a second regenerative mass 27 separated by a central space 28. Each of the regenerative masses has a plurality of channels extending therethrough as indicated by the arrows numbered 30. The cracking process used is one operating on a "heat and make" two-step cycle in which the two regenerative masses 26 and 27 are first heated to above a cracking temperature by the combustion of fuel with air, the gases of combustion being passed through the channels in the regenerative masses. The feed to be cracked is then passed through these channels. Valves 31 to 34 inclusive control the flow of steam, propane, recycle gas and air respectively into line 35 and thence through a branch line 35a having a valve 36 into a line 37 leading into the first regenerative mass 26 and through a branch line 35b having a valve 38 into a line 39 leading into the second regenerative mass 27. The first regenerative mass 26 is connected to the tar separator 12 through line 37, a branch line 42a and a line 42, the line 42a having a valve 43 therein, and the line 42 having a valve 44 therein. The second regenerative mass 27 is similarly connected through line 39, a branch line 42b having a valve 46 therein, and the line 42 to the tar separator. Fuel gas is introduced into the space 28 through a line 50 having a valve 51 therein.

It is necessary to first heat the furnace in starting operations which may be accomplished by opening valves 34, 36, 51, 46 and 44 whereby air flows through the first regenerative mass 26, meeting fuel gas in the space 28 where combustion takes place, and the combustion products at high temperature flow through the channels in mass 27 and out through the line 39, line 42b, valve 46, line 42 and valve 44 to the tar separator 12. After a short heating period, usually one minute, the valves 36 and 46 are closed and the valves 38 and 43 are opened and the gases flow in the opposite direction through the furnace somewhat cooling the mass 27 and heating the mass 26. When the temperature of the mass 26 and mass 27 at the ends adjacent to the combustion space 28 reaches approximately 2000° F., the preliminary heating step is completed and the make step may be started.

In the make step all the valves heretofore mentioned are closed with the exception of valves 31, 32, 33, 38, 43 and 44. In-gas, formed by mixing steam, propane and recycle gas, is delivered through line 35, valve 38 and line 39, through the channels in the masses 27 and 26 and out through the lines 37, valve 43, lines 42a and 42 and valve 44 to the tar separator. The period of residence of the gas in the furnace may be in the neighborhood of approximately 1/10 of a second. After the make cycle has been operating approximately one minute, valves 31, 32, and 33 are closed and valves 34 and 51 are opened, again heating the mass 27, following which step the valves are again changed to reverse the direction of flow in a make step which is succeeded by a heat step in the same direction, again heating mass 26. Thereafter, successive heat and make steps, each approximately one minute in duration and reversing the direction of flow after each heat step, as above detailed, are continued.

Regardless of the direction of flow of the products of combustion in the furnace during the heating step, they eventually pass the tar separator and the condenser 13 to the blower 17 which maintains a vacuum during the entire operation of the process in the furnace 11. From the blower 17 the products of combustion may pass to a stack through a valve 52.

From the cracked gas which is fed into the tar extractor as a result of the make step, tar is extracted in the tar separator 12 which is fed with water through a valve 53, water and tar being withdrawn from the extractor through a valve 54. The valve 52 being closed during the make cycle of the furnace and a valve 56 in a line 57 being open, the cracked gas freed from tar and water passes to the electric precipitator 14 where any liquid or solid particles carried in the gas are removed and delivered as a liquid or sludge through a line 58. The cracked gas is then delivered through a line 60 to the compressor 16 and at a pressure in the typical plant of about 150 p. s. i. through the cooler 18 where the gas mixture is cooled and delivered to a pipe 62. The gas from the electric precipitator 14 can also go through a line 59 to and from the cracked gas holder 15 which floats on the line 59 between the precipitator 14 and compressor 17.

In addition to the cracked gas from the furnace 11, there is fed back into the cracked gas holder 15 through a line 63, a gas mixture from the first acetylene rectifying column 23 which contains approximately 50% by volume of acetylene therein as hereinafter related. In the illustrative example the mixture of these gases with the cracked gases showed on analysis the following composition at the intake of the compressor.

|  | Percent by volume |
|---|---|
| $CO$ | 7.9 |
| $N_2$ | 5.5 |
| $H_2$ | 47.0 |
| $CH_4$ | 14.7 |
| $C_2H_2$ | 13.1 |
| $C_2H_4$ | 8.4 |
| $C_2H_6$ | .1 |
| $C_3H_4$ | .4 |
| $C_3H_6$ | .1 |
| $C_3H_8$ | .3 |
| $C_4H_2$ | .1 |
| $C_4H_4$ | .3 |
| $C_4H_6$ | .1 |
| $C_6H_6$ | .3 |
| $CO_2$ | 2.0 |

It may be seen from this example that the mixture from which the acetylene is to be separated also includes di-acetylene and other heavy acetylenes as well as other gases, primarily hydrogen, methane, ethylene, carbon monoxide, nitrogen and carbon dioxide.

Figure 3:
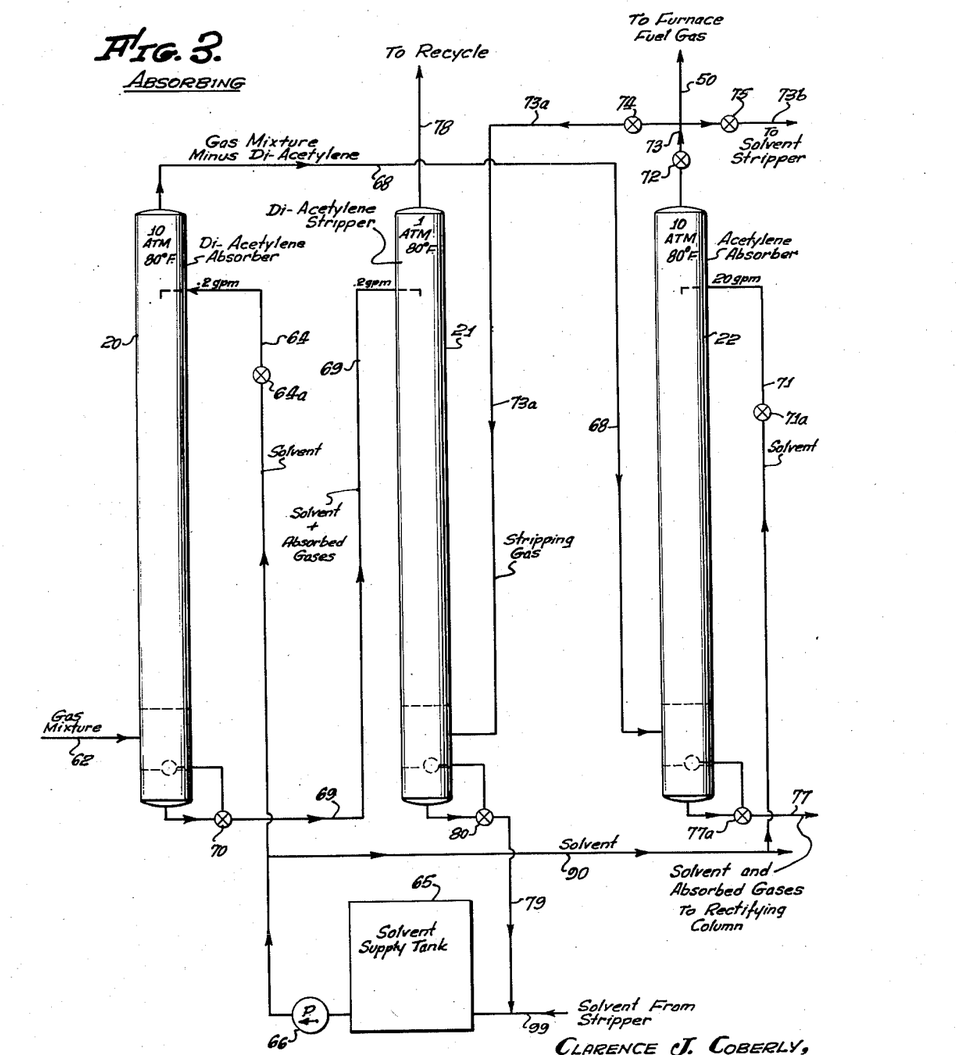
Fig. 3 is another section of the flow diagram shown in Fig. 1 illustrating in greater detail the absorption portion of the separation process.

Referring next to Fig. 3, there is shown the relation of the various elements of the gas absorbing system the function of which is to first absorb in a solvent all the di-acetylene in the gas mixture together with a small amount of acetylene and substantial amounts of other heavy acetylenes such as methyl acetylene, $C_3H_4$; vinyl acetylene, $C_4H_4$; ethyl acetylene, $C_4H_6$, and other heavy acetylenes having molecular weight corresponding to $C_6H_6$, and then to drive these gases off from the solvent into a recycle line returning to the cracking unit. By this means the di-acetylene is eliminated from the mixture in the first separation operation. The gas mixture minus the di-acetylene is then absorbed in the solvent for rectification.

The solvent employed in such operation is capable of selective absorption of the acetylene gas from the gas mixture under varying conditions of temperature, pressure and concentration, such solvents as acetone, dimethyl formamide or acetonyl acetone being suitable. I prefer acetonyl acetone and the process as hereafter described presupposes the use of this particular solvent, although other solvents may be employed without altering the method of my invention.

The gas mixture enters the di-acetylene absorber column 20 near the bottom thereof through line 62 and is passed upwardly therethrough under a pressure of approximately 10 atmospheres in the column and at room temperature. Solvent is introduced at the rate of approximately .2 gallon per minute into the upper portion of the column 20 through a line 64 and control valve 64a from a solvent supply tank 65, a pump 66 serving to supply the solvent under pressure greater than 10 atmospheres. The di-acetylene contained in the mixture as well as all of the benzene and $C_6H_6$ acetylenes and a part of the other heavy acetylenes and other gases is absorbed in the solvent as the gas passes upwardly through the column which is filled with suitable packing, such as Raschig rings, and upon emerging from the top of the tower into a line 68 the gas mixture has been found to have the following composition:

|  | Percent by volume |
|---|---|
| $CO$ | 8 |
| $N_2$ | 5.6 |
| $H_2$ | 47.4 |
| $CH_4$ | 14.9 |
| $C_2H_2$ | 12.6 |
| $C_2H_4$ | 8.5 |
| $C_2H_6$ | .1 |
| $C_3H_4$ | .3 |
| $C_3H_6$ | .1 |
| $C_3H_8$ | .3 |
| $C_4H_2$ | 0 |
| $C_4H_4$ | .2 |
| $C_4H_6$ | .1 |
| $C_6H_6$ | 0 |
| $CO_2$ | 1.9 |

It is thus seen that the potentially hazardous di-acetylene has been completely eliminated from the mixture in this step. The solvent solution passing downwardly in the tower 20 and containing the absorbed di-acetylene is withdrawn from the bottom thereof and fed through line 69 having a valve 70 therein into the di-acetylene separator or stripper column 21 at the upper portion thereof. Stripping gas is introduced adjacent the bottom of the column 21 through a line 73a, the pressure in the column 21 being maintained at atmospheric and the temperature being maintained at room temperature. The gases absorbed in the solvent introduced in the line 69 are driven off by the stripping gas as it passes upwardly through the column which is also packed with Raschig rings, the mixture then passing out the top of the column through the line 78 and recycled to the furnace. The solvent at the bottom of the column 21, now stripped of the absorbed gases, is fed through a line 79 having a valve 80 therein back to the solvent supply tank.

The gas mixture, now minus di-acetylene benzene and $C_6H_6$ acetylenes, but containing a small quantity of other heavy acetylenes as shown by the above analysis, is fed through the line 68 into the acetylene absorber tower 22 adjacent the bottom thereof. This tower 22 is packed with Raschig rings supplied with solvent introduced at the upper portion thereof from the solvent supply tank 65 by a line 71 and control valve 71a. A pressure of approximately 10 atmospheres is maintained and solvent is fed to the tower 22 at a sufficient rate, for example 20 gallons per minute, to permit absorption as the gas mixture passes upwardly therein through the down flowing solvent, of all the remaining acetylene and the remaining heavy acetylenes in the mixture, together with incidental absorption of small amounts of the other gases such as carbon monoxide, carbon dioxide, nitrogen, hydrogen, methane, ethane and propane and a substantial part of the ethylene and carbon dioxide. The off-gas from the top of this absorption tower discharges through a pressure reducing valve 72 into a line 73 having the branch 50 supplying fuel to the furnace 11, the second branch 73a having a valve 74 therein leading to the stripping column 21 and a third branch 73b having a valve 75 therein leading to the solvent stripper 25 and supplying stripping gas thereto. This off-gas contains substantially all of the gases of the mixture other than acetylene and heavy acetylenes, the principal ones being hydrogen, methane, nitrogen, ethylene, propane, carbon monoxide and carbon dioxide.

The solution from the bottom of the column 22 which contains all of the acetylene, the remaining heavy acetylenes and the absorbed portion of the other gases is fed through a line 77 to the first rectifying column 23. Column 23 as well as columns 24 and 25 are also packed with Raschig rings. The analysis of absorbed gases in this solution shows the following composition:

| | Percent by volume |
|---|---|
| CO | 1.4 |
| $N_2$ | .2 |
| $H_2$ | .6 |
| $CH_4$ | 3.9 |
| $C_2H_2$ | 64.8 |
| $C_2H_4$ | 13.9 |
| $C_2H_6$ | .5 |
| $C_3H_4$ | 1.7 |
| $C_3H_6$ | .5 |
| $C_3H_8$ | .9 |
| $C_4H_4$ | .9 |
| $C_4H_6$ | .3 |
| $CO_2$ | 10.7 |

Figure 4:
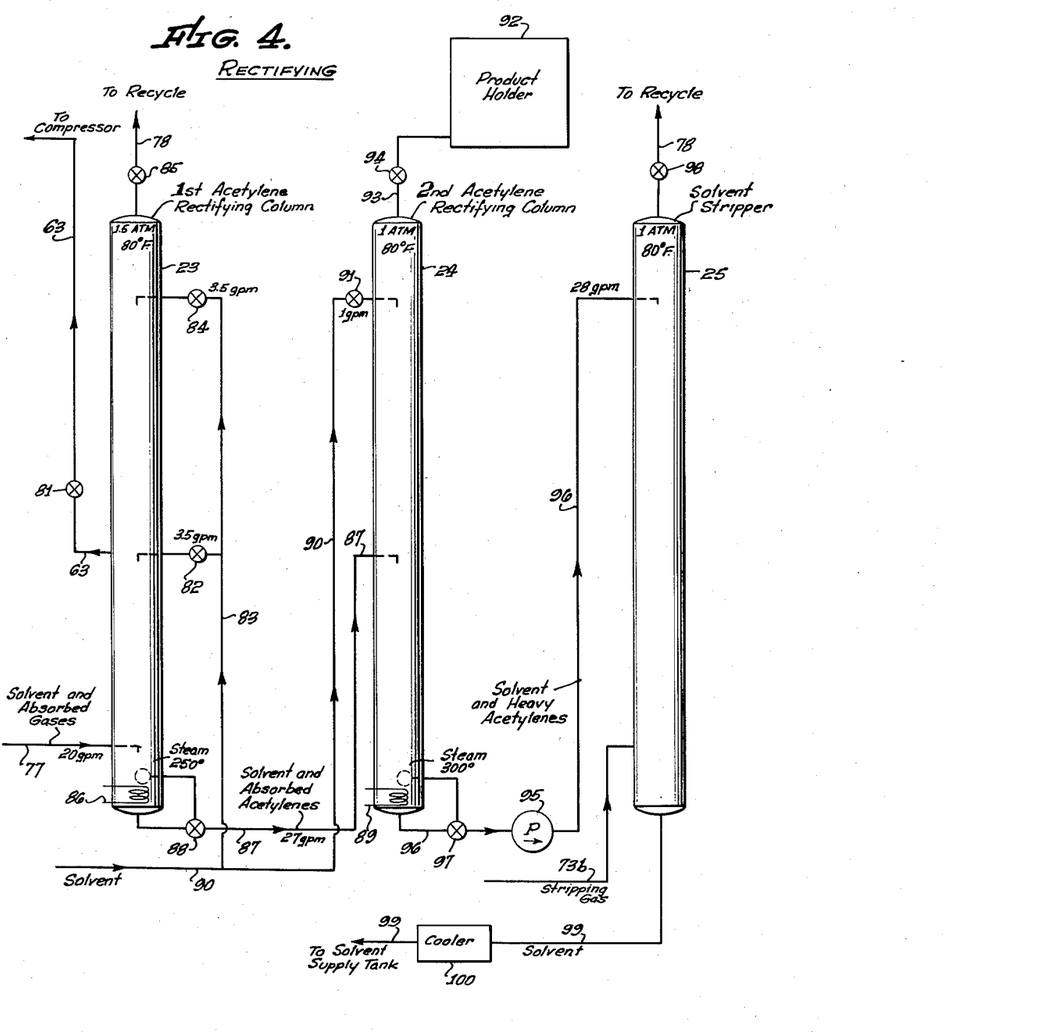
Fig. 4 is another section of the flow diagram shown in Fig. 1 illustrating in greater detail the rectification portion of the separation process.

Referring to Fig. 4 which details the rectifying system, there is shown the first rectifying column 23 wherein the acetylene and remaining heavy acetylenes are separated from the other gases in the mixture by rectification of the solution containing the absorbed gas mixture, and the second rectifying column 24 wherein the remaining heavy acetylenes are separated from the acetylene by rectification of the solution containing these final components.

The solution containing the absorbed gases is fed into the first rectifying column 23 at a point near the bottom of the column through line 77 having a valve 77a therein (shown in Fig. 3).

A reboiler 86 fed with steam at 250° F. is provided at the bottom of the column which heats the solution. Under the influence of the reduced pressure of approximately 1.5 atmospheres absolute in the column 23 and heating of the solvent solution, all of the ethylene, carbon dioxide and other gases which are present in small amounts in the solution are driven off together with a substantial part of the acetylene. All of carbon dioxide, ethylene and the part of the acetylene which is driven off are taken out at about the mid-point of the column through line 63 having a valve 81 therein. A sufficient amount of lean solvent, for example 3.5 gal. per minute, is fed in at this point through a valve 82 in a line 83 to control the amount of acetylene which is allowed to escape and to permit all of the gases other than acetylene and the remaining heavy acetylenes to go out at the mid-point or to go on to the top of the column.

The gas which is removed from the column 23 at the mid-point and which contains approximately 50% of acetylene, together with ethylene, methane, carbon dioxide and a small quantity of other gases, is recycled through line 63 to the intake of the compressor and mixes with the gas from the cracking unit to enrich the acetylene content of same. The gas which goes on through the upper one-half of the rectifying column is also refluxed with a small amount of lean solvent which is introduced through a valve 84 in line 83 at a point near the top of the column at a rate of approximately 3.5 gal. per minute, thereby preventing the escape of any acetylene from the top of the column. The gas which comes off the top of the column is largely ethylene and carbon dioxide and these gases are fed through a valve 85 into the recycle line 78 returning to the furnace.

It is also feasible in the operation of my process to introduce solvent at the same rate of 3.5 gal. per min. only at the top of the column 23 through line 83 and valve 84, closing valve 82, thus taking off no side stream at the middle of the column 23. In place of this all of the gas from the top of the column may be recycled back to the compressor and none returned to the furnace through line 78. The reflux solvent introduced at the top of the column then controls the amount of acetylene which is recycled to the compressor and permits all of the other gases to be so recycled except the heavy acetylenes which go out the bottom of the column with the remaining acetylene as heretofore described.

The return of these other gases from the top of the column to the compressor causes the concentration thereof in the system to increase to such an extent that the amount of such other gases, primarily hydrogen, methane, nitrogen, ethylene, carbon monoxide and carbon dioxide, which is removed from the top of the acetylene absorber 22, as heretofore described, balances the amount of such other gases that originally entered the system from the furnace, less the amount absorbed in the di-acetylene column 20.

The solution from the bottom of the rectifier 23 in either event contains the acetylene and remaining heavy acetylenes absorbed by the lean solvent and has the composition:

| | Percent by volume |
|---|---|
| $C_2H_2$ | 93.6 |
| $C_3H_4$ | 3.7 |
| $C_4H_4$ | 2.0 |
| $C_4H_6$ | .7 |

This solution is fed through a line 87 and a valve 88 to the mid-point of the second rectifier column 24 where the pressure is reduced to atmosphere. The second rectifier column is also provided with a reboiler 89 which is operated at a higher temperature than the reboiler 86 of the first rectifier 23 and since the pressure is also lower, the acetylene is driven from the solution leaving most of the heavy acetylenes. The acetylene gas, as it goes up the column, is refluxed with a small amount of lean solvent near the top which is introduced at a rate of approximately 1 gal. per min. through a line 90 having a valve 91 therein, thereby preventing the escape of any of the heavy acetylenes but permitting all the acetylene to discharge out the top. This gas will now be substantially 100% pure acetylene and is conducted to a product holder 92 via a line 93 and a valve 94.

The heavy acetylenes which remain in the solution of the second rectifying column 24 are then pumped, by means of a pump 95, through a line 96 and a valve 97 to the top of the solvent stripper 25. Stripping gas from the acetylene absorber 22 is introduced near the base of the column through line 73b and flowed therethrough counter current to the liquid so that all of the remaining heavy acetylenes are driven off mixed with the stripipng gas and emerge from the top of the column and pass through a valve 98 into the recycle line 78. The remaining lean solvent at the base of the column 25 is returned via a line 99 through a cooler 100 to the solvent supply tank 65.

From this description, it can be seen that all of the di-acetylene, which is a dangerous gas to handle, is removed early in the system and then all of the remaining acetylene and part of the other desired gases are put into the solution and then those which are less soluble than acetyelne are removed, following which the acetylene is removed, leaving only the heavy acetylenes which are then stripped out so as to obtain lean solvent containing substantially no gases, which is then returned through a cooler to the solvent supply tank.

Figure 5:
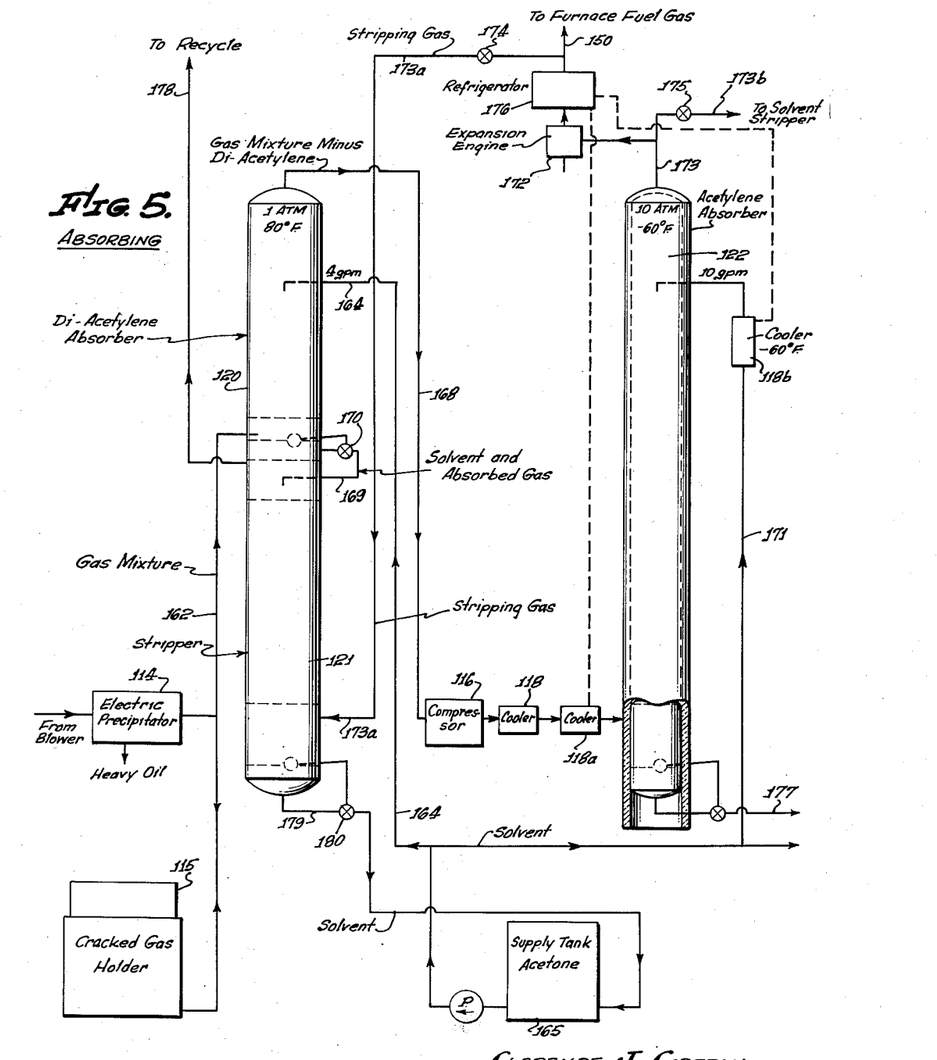
Fig. 5 is a flow diagram illustrating a modified form of the absorption portion of the separation process.

In Fig. 5 there is illustrated a modified form of my single solvent separation process, which differs from the system shown in Figs. 1 to 4, inclusive, in respect of the gas absorption process shown in the drawing, the remaining part of the system requiring the same arrangement of apparatus as hereinabove illustrated and described.

The system shown in Fig. 5 differs primarily in the use of a low cost volatile solvent, such as acetone, requiring the operation at low temperature so as to limit the loss of solvent into the off-gas. In addition, in the system illustrated the di-acetylene absorber 120 is placed between the electric precipitator 114 and the compressor 116 and therefore operates at substantially atmospheric pressure. This is advantageous because of the fact that di-acetylene is explosive and tends to polymerize. It has been found that under some conditions the heat of compression will cause the di-acetylene to polymerize, and such polymers have been a source of gum formation in the valves of the compressor. The accumulation of these di-acetylene polymers in quantity may also be a cause of dangerous explosions. Thus in the arrangement shown in Fig. 5 the di-acetylene is removed prior to compressing the gas mixture.

In the arrangement shown the di-acetylene absorber 120 and the stripper 121 are combined into one column with the di-acetylene absorber on top, so that liquid will flow by gravity into the stripper. The cracked gas mixture is fed directly from the electric precipitator 114 and cracked gas holder 115 through line 162 to the bottom of the di-acetylene absorber column 120 and is passed upwardly therethrough under atmospheric pressure at room temperature. Solvent is introduced into the upper portion of the column 120 through a line 164 from solvent supply tank 165 at a rate of approximately 4 gallons per minute. The di-acetylene, as well as a small quantity of other heavy acetylenes and other gases, is absorbed in the solvent which flows into the top of the stripper 121 through line 169 having float valve 170 therein. The gas emerging from the top of the column 120 passes through the line 168 to the compressor 116. Since this gas is minus the di-acetylene, no danger now exists of explosion in the compressor arising from the formation of di-acetylene polymers.

Stripping gas is introduced adjacent the bottom of column 121 through a line 173a thereby drawing off the gases absorbed in the solvent from the bottom of the di-acetylene absorber. This gas mixture passes out the top of column 121 through line 178 and is recycled to the furnace. The solvent at the bottom of column 121 is fed through line 179, having valve 180 therein, back to the solvent supply tank.

From the compressor the gas mixture minus diacetylene is fed through coolers 118 and 118a into the bottom of the acetylene absorber 122. This tower is heavily insulated, and the gas mixture is cooled to approximately −60° F. in cooler 118a before such introduction. Likewise, the acetone solvent introduced adjacent the top of the column through line 171 is cooled in cooler 118b to −60° F. The use of refrigeration to cool the tower 122, by means of the coolers 118a and 118b, increases the absorption capacity of the acetone within such tower. A pressure of approximately 10 atmospheres is maintained, and the acetone is fed to the tower 122 at approximately 10 gallons per minute to permit absorption of all the remaining acetylene and heavy acetylenes in the mixture.

The off-gas from the top of the absorption column 122, which is free of the acetylene and heavy acetylenes, discharges via line 173 through an expansion engine 172, expanding the gas down to atmospheric pressure. This engine may in turn be connected to an electric generator (not shown) or to one of the pumps or other auxiliary units which require power. The expansion of these gases from 10 atmospheres down to one atmosphere causes a substantial reduction in temperature of the off-gas, which will in turn cause any volatilized acetone to be condensed so that it may be returned to the system. Such expansion of the off-gases may likewise provide the refrigeration for coolers 118a and 118b as illustrated in the drawing which shows the off-gas from the expansion engine 172 passing through a refrigerator 176 and thence through valve 174 to line 173a leading to the stripping column 121. The refrigerator 176 may likewise provide refrigeration for coolers (not shown) at the top of each of the other columns for the purpose of minimizing the loss of solvent escaping therefrom in the gas stream. A branch line 150 from the refrigerator 176 leads to the furnace 11. A branch from the line 173, namely line 173b, having valve 175 therein, also leads to the solvent stripper supplying stripping gas thereto from the top of the acetylene absorber.

The solution from the bottom of the column 122 which contains all the acetylene, the remaining heavy acetylenes, and the absorbed portion of the other gases, is fed through a line 177 to the first rectifying column 23 and thereafter treated in the same manner as heretofore described with respect to Fig. 4 of the drawing, with the exception of the maintenance of lower temperatures in the rectifying and final stripping columns in order to minimize the volatilization of the acetone.

It may be seen therefore that the modification shown in Fig. 5 describes a system which differs from that heretofore described in the use of a highly volatile solvent and, further, in the compressing of the gas mixture only after removal of the di-acetylene therefrom.

I claim as my invention:

1. A process of separating acetylene, diacetylene, and other heavy acetylenes from a mixture containing these and other gases, including the steps of: introducing the gas mixture into a diacetylene absorber column; maintaining said diacetylene absorber column substantially at atmospheric temperature and at a pressure of about 10 atmospheres; passing said gas mixture through a first quantity of a solvent in said diacetylene absorber column to absorb substantially all of the diacetylene therefrom and to form a second gas mixture substantially free of diacetylene; passing said first quantity of solvent with diacetylene absorbed therein to a diacetylene separator column maintained substantially at atmospheric temperature and pressure; in the diacetylene separator column separating the diacetylene from said first quantity of solvent; passing said first quantity of solvent substantially free of diacetylene from said diacetylene separator column directly back to a common source of said solvent; passing said second gas mixture from said diacetylene absorber column into an acetylene absorber column; maintaining said acetylene absorber column at a pressure of about 10 atmospheres; in said acetylene absorber column contacting said second gas mixture with a second quantity of said solvent to absorb a substantial portion of the acetylene and other gases contained in said second gas mixture including substantially all of the heavy acetylenes therein; passing said second quantity of solvent containing a substantial amount of acetylene, heavy acetylenes, and said other gases from said acetylene absorber column into a first rectifier column; in said first rectifier column heating said second quantity of solvent to about 250° F. at a pressure of about 1.5 atmospheres to separate therefrom said other gases and a portion of said acetylene contained therein to form a third gas mixture; in said first rectifier column contacting said third gas mixture with a third quantity of said solvent to remove from said third gas mixture a portion of the acetylene contained therein; mixing said second and third quantities of solvent in said first rectifier column to form a solvent mixture; passing said solvent mixture from said first rectifier column into a second rectifier column; in said second rectifier column heating said solvent mixture to a temperature in excess of the temperature employed in said first rectifier column, to separate therefrom substantially all of the acetylene and a small portion of heavy acetylenes contained therein to form a fourth gas mixture containing principally acetylene and a small quantity of heavy acetylenes; in said second rectifier column refluxing said fourth gas mixture with a fourth quantity of said solvent to remove from said fourth gas mixture substantially all of said heavy acetylenes contained therein; and passing acetylene substantially free of said heavy acetylenes from said second rectifier column to a point of storage or use.

2. A process of separating acetylene, diacetylene, and methylacetylene from a mixture containing these and other gases, including the steps of: introducing the gas mixture into a diacetylene absorber column; maintaining said diacetylene absorber column substantially at atmospheric temperature and at a pressure of about 10 atmospheres; passing said gas mixture through a first quantity of a solvent in said diacetylene absorber column to absorb substantially all of the diacetylene therefrom and to form a second gas mixture substantially free of diacetylene; passing said first quantity of solvent with diacetylene absorbed therein to a diacetylene separator column maintained substantially at atmospheric temperature and pressure; in the diacetylene separator column separating the diacetylene from said first quantity of solvent; passing said first quantity of solvent substantially free of diacetylene from said diacetylene separator column directly back to a common source of said solvent; passing said second gas mixture from said diacetylene absorber column into an acetylene absorber column; maintaining said acetylene absorber column at a pressure of about 10 atmospheres; in said acetylene absorber column contacting said second gas mixture with a second quantity of said solvent to absorb a substantial portion of the acetylene and other gases contained in said second gas mixture including substantially all of the methyl acetylene therein; passing said second quantity of solvent containing a substantial amount of acetylene, methyl acetylene, and other gases from said acetylene absorber column into a first rectifier column; in said first rectifier column heating said second quantity of solvent to about 250° F. at a pressure of about 1.5 atmospheres to separate therefrom said other gases and a portion of said acetylene and methyl acetylene contained therein to form a third gas mixture containing said other gases, acetylene, and methylacetylene; in said first rectifier column contacting said third gas mixture with a third quantity of said solvent to remove from said third gas mixture a portion of the acetylene and methyl acetylene contained therein; mixing said second and third quantities of solvent in said first rectifier column to form a solvent mixture containing acetylene and said methylacetylene; passing said solvent mixture from said first rectifier column into a second rectifier column; in said second rectifier column heating said solvent mixture to a temperature in excess of the temperature employed in said first rectifier column, to separate therefrom substantially all of the acetylene and a small portion of the methylacetylene contained therein to form a fourth gas mixture containing principally acetylene and a small quantity of methylacetylene; in said second rectifier column refluxing said fourth gas mixture with a fourth quantity of said solvent to remove from said fourth gas mixture substantially all of said methylacetylene contained therein; and passing acetylene substantially free of said methylacetylene from said second rectifier to a point of storage or use.

References Cited in the file of this patent
UNITED STATES PATENTS

| | | |
|---|---|---|
| 2,714,940 | Milligan | Aug. 9, 1955 |
| 2,741,332 | Finneran et al. | Apr. 10, 1956 |

OTHER REFERENCES

Petroleum Refiner, November 1953, vol. 32, pages 118–120.